United States Patent [19]

Martin

[11] 4,194,843
[45] Mar. 25, 1980

[54] MIXER

[76] Inventor: Ernest N. Martin, 26937 N. Broadway, Escondido, Calif. 92026

[21] Appl. No.: 29,730

[22] Filed: Apr. 13, 1979

[51] Int. Cl.² .......................... B01F 15/02; B01F 7/12
[52] U.S. Cl. .................................. 366/138; 366/156; 366/159; 366/176
[58] Field of Search ............... 366/102, 138, 154, 155, 366/159, 163, 164, 165, 168, 176, 156, 263, 264, 265; 415/92

[56] References Cited

U.S. PATENT DOCUMENTS

| | | | |
|---|---|---|---|
| 2,551,713 | 5/1951 | Ulke | 366/102 |
| 2,688,470 | 9/1954 | Marco | 366/155 |
| 3,018,091 | 1/1962 | Duggins | 366/165 |

*Primary Examiner*—Robert W. Jenkins
*Attorney, Agent, or Firm*—Georges A. Maxwell

[57] ABSTRACT

A beverage mixer comprising a housing defining a chamber with an outer cylindrical surface and a radial front surface, an impeller rotatably arranged in the chamber and having outside and forward surfaces in close, opposing running clearance with said front and rear surfaces, a fluid material inlet opening in the housings opening at the lower portion of the front surface in the chamber and a fluid material outlet opening, opening at the lower portion of the outside surface in the chamber, said impeller has a plurality of circumferentially spaced radially extending axially forward and radially outwardly opening slots on an annular space rearward of and communicating with the slots, said slots and space allow for circulation of fluid materials within the chamber into and out of the spaces between said opposing outer and outside and said front and forward surfaces, between which said materials are mixed by the surface effect of and between those surfaces when the impeller rotates; the mixer further includes air inlet means metering air into said space to mix with fluid material therein.

8 Claims, 7 Drawing Figures

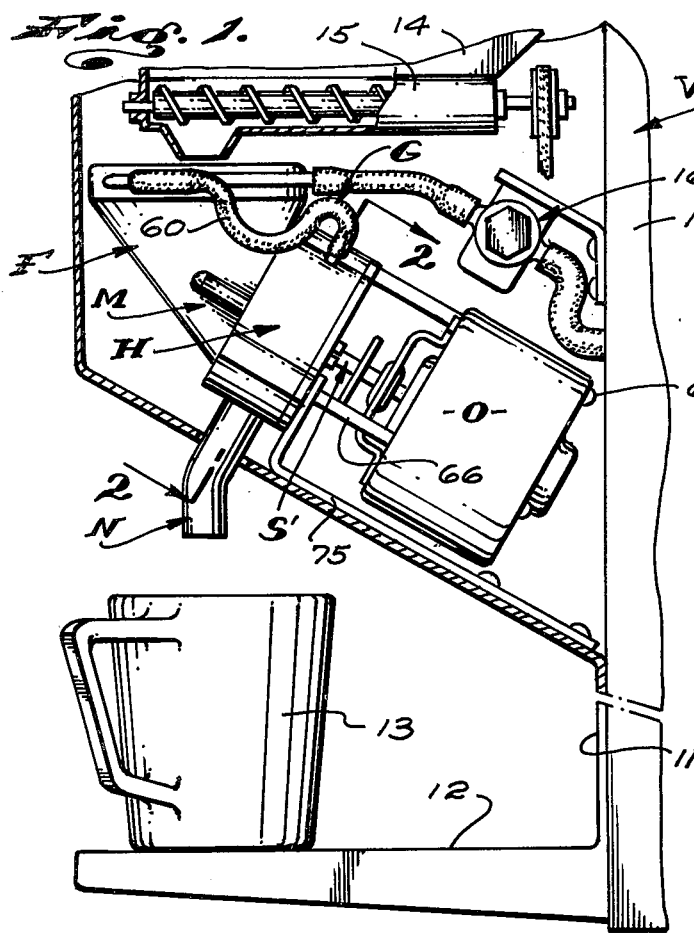
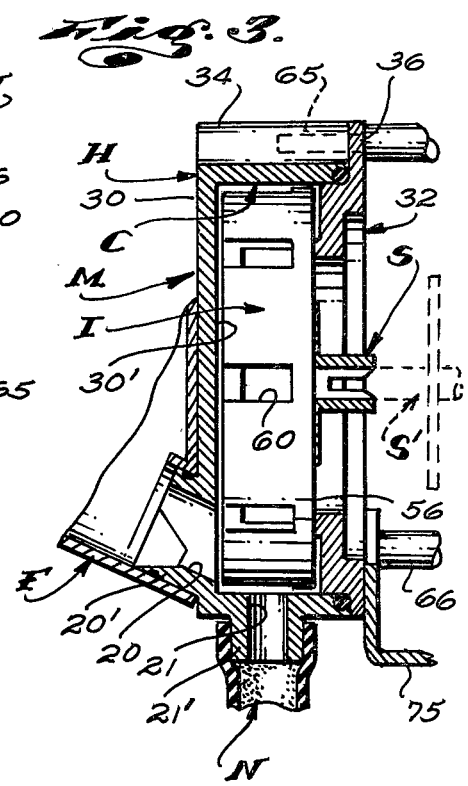
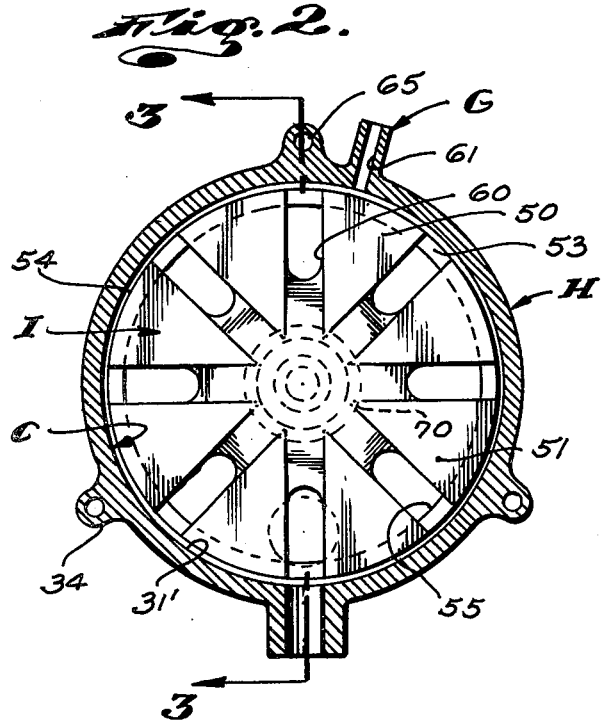
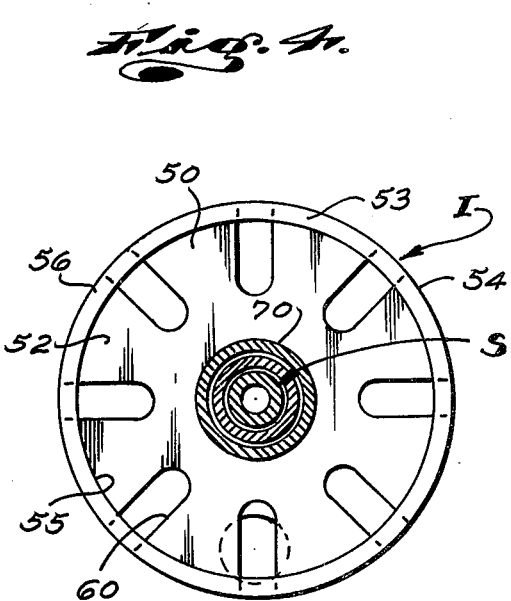

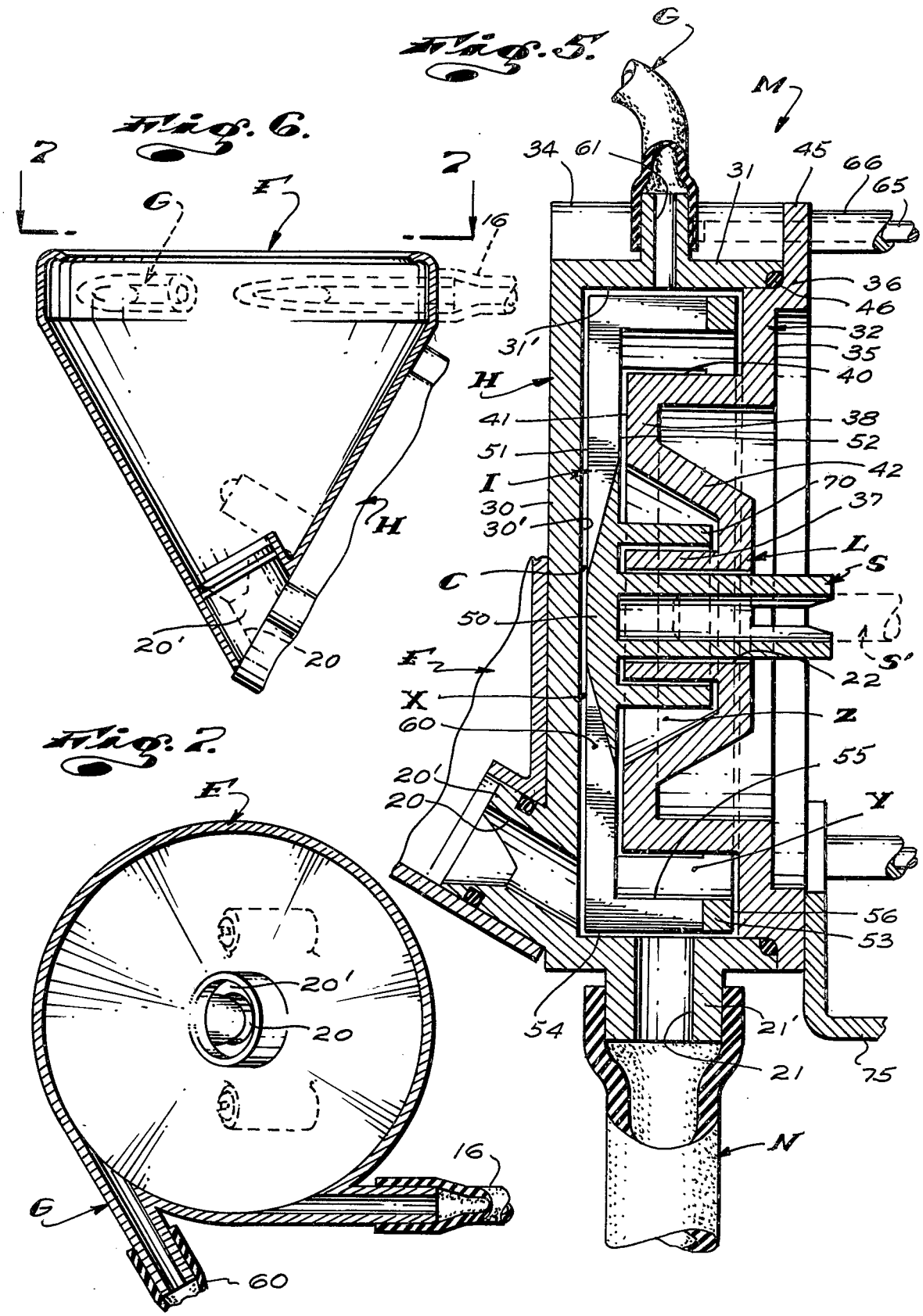

MIXER

This invention has to do with an improved mixer and is more particularly concerned with a device for mixing together and beating measured volumes of fluid, particulate or powdered soluble material and air to establish a well blended and aerated liquid product.

The mixer here provided is in that class of mixing devices or machines that are found and are commonly used in coin operated beverage vending machines.

The mixer structure here provided is particularly concerned with the mixing and beating together of dry powdered cocoa concentrate, hot water and air.

It has been determined that in the preparation, or the mixing of cocoa concentrate and hot water, it is highly desirable that the water and concentrate not only be thoroughly mixed together but that the mixture be beaten with or in the presence of air so that it becomes aerated, whereby the resulting beverage is foamy and smooth. The noted beating and mixing in of air gives or imparts into the resulting beverage a richer, more full bodied or thicker texture and also serves to better maintain the solids of the beverage in suspension.

The prior art has provided a number of mixing machines or devices particularly suited for mixing cocoa concentrate and hot water or the like. Those structures have characteristically included motor driven shafts extending into mixing chambers having axially offset radially disposed upper inlet openings and lower discharge openings and mixing impellers comprising freely radially extending paddles or propeller like blades on the shafts, within the chambers and above the outlet openings. The propeller blades or paddles in those structures of the prior art referred to above serve to engage the water and beverage concentrates introduced into the chambers through the inlet openings thereof, as the noted ingredients drop downwardly through said chamber, striking, beating and flinging the ingredients in and about the chamber in a rather random manner which tends to cause mixing of the ingredients as they migrate downwardly through the chamber and out through the lower outlet openings thereof. While there exists an abundant supply of air in the chambers of the prior art structure referred to above, the air, like the beverage ingredients, occur within the chambers in a free state, with no means provided to cause or induce mixing air into and with the ingredients and to ensure the establishment of an aerated, foamy and rich textured beverage. The ingredients acted upon by the paddle like impellers in the prior art structures tend to simply move and displace the free air in the chambers as those ingredients are cast about in said chambers.

Further, in the prior art structures of the character referred to above, mixing together of the water and of the beverage concentrate, in large part, results from the impacting of the freely moving ingredients within the chamber and is assisted to a very minor extent by direct mechanical working and mixing of the ingredients by and/or between relatively moving parts of the machines.

An object and feature of my invention is to provide an improved mixer of the general character referred to in the preceding which includes a rotor or impeller within a mixing chamber wherein the rotor or impeller and of the chamber have closely related, opposing, relatively moving surfaces between which ingredients to be mixed are conducted and whereby thorough and effective mixing and blending of said ingredients is effected by the surface effect of said relatively moving surfaces.

It is another object and feature of this invention to provide an improved mixer of the general character referred to which includes novel means for pumping, directing and admixing air into the ingredients which are introduced into, worked upon or mixed by and dispensed from the mixer structure.

In prior art mixers of the character referred to in the preceding, the materials or ingredients handled or worked upon thereby depend upon gravity to effect their discharge or drainage from the chambers, through the lower discharge openings thereof. The paddle like impellers, rotating substantially freely in the chambers, which may serve to cast and fling a portion of the mixed ingredients out through the discharge openings have little or no effect on discharging the last portion of the mixed ingredients, from the chambers, and in many instances generate movements of air which tend to back up and prevent final and complete discharge or drainage of mixed ingredients from the chambers.

It is an object and feature of my invention to provide a new and improved mixer of the general character referred to above wherein the above noted novel means for pumping air serves to effectively move the air in the chamber in a manner to effectively and efficiently blow the chamber clean of ingredients and to urge the last of the ingredients remaining in the chamber out through the discharge opening thereof.

It is another object and feature of my invention to provide a structure of the general character referred to above wherein the means for pumping air is related to the impeller, the impeller shaft and the impeller shaft opening in the chamber, so that the air pumped thereby moves inwardly into the chamber through the shaft opening, about the shaft and thence radially outward of the shaft and its opening whereby the fluids within the chamber cannot move and migrate out through said shaft opening and about said shaft.

It is yet another object and feature of my invention to provide a structure of the character referred to above wherein the means for pumping air is provided with or includes novel labyrinth type air metering and fluid sealing means related to the shaft and shaft opening.

Yet another object of this invention is to provide a novel rotor or impeller which is substantially coextensive with the interior of the chamber and which is characterized by substantially radially and axially disposed ingredient engaging working surfaces and by a plurality of circumferentially spaced radially and axially extending material conducting, distributing and driving slots.

It is an object and feature of the present invention to provide a mixer of the general character referred to which includes novel recirculating means which serves to recirculate a portion of the liquid mixture for reintroduction into the chamber through the inlet opening thereof and in such a manner as to wash and flush beverage concentrate which was delivered to, but which did not advance into the chamber of the mixer.

An object and feature of my invention is to provide a mixer of the character referred to above, the principal parts and/or portions of which include but three non-standard parts; each of which parts is particularly adapted to being easily and economically produced by suitable molding or die casting techniques; a mixer which is easy and economical to assemble and maintain a mixer which is durable, highly effective and dependable in operation.

The foregoing and other objects and features of my invention will be fully understood from the following detailed description of a typical preferred form and application of my invention throughout which description reference is made to the accompanying drawings, in which:

FIG. 1 is a view of a portion of a beverage vending machine with parts broken away and showing my mixer related thereto;

FIG. 2 is an enlarged sectional view taken substantially as indicated by line 2—2 on FIG. 1;

FIG. 3 is a sectional view taken as indicated by line 3—3 on FIG. 2;

FIG. 4 is a rear elevational view of the impeller;

FIG. 5 is an enlarged detailed sectional view of the structure shown on FIG. 3;

FIG. 6 is a sectional view of the funnel structure shown on FIG. 1; and

FIG. 7 is a view taken substantially as indicated by line 6—6 on FIG. 6.

The vending machine V shown in FIG. 1 of the drawings includes generally vertical box-like cabinet 10 with a forwardly and laterally opening recess 11. A cup supporting drip tray 12 is established at the bottom of the recess 11 to support a cup 13 or like receptacle into which a beverage, such as hot cocoa, is to be deposited. The mixer M that I provide is suitably mounted in the cabinet immediately above the recess 11, substantially as shown. A hopper type material or beverage concentrate supply unit 14 with a related material dispensing means 15 is provided in the cabinet above the mixer M. Within the cabinet, rearward of the mixer M, unit 14 and means 15 is a hot water supply (not shown). Finally, in the case illustrated, the machine V includes valve controlled water delivery means 16.

The material dispensing means 15 and water delivery means 16 operate to deliver measured volumes of material, such as powdered cocoa concentrate and water into the mixer M. The mixer M mixes the water and the material together, beating air into or with the mixture and discharges or delivers the aerated mixture or beverage into the cup 13 supported on the tray 12.

In addition to the above, the vending machine V can include such additional means as coin actuated control means, electric, mechanical, or electro-mechanical control devices related to the various means of the machine noted above and with each other, in accordance with common practice in the vending machine art.

Apart from the mixer M, the nature, design and construction of the machine V and of the various parts, portions and/or components thereof can vary widely without affecting the novelty of the present invention. Accordingly, except for the mixer M, the structure shown in FIG. 1 of the drawings is only intended to show a typical environment in which the mixer M that I provide might be advantageously related and is not to be interpreted as limiting or restricting the use to which my new mixer might be put.

The mixer M that I provide includes generally, a housing H defining the chamber C and having an inlet opening 20 and outlet opening 21 and a shaft opening 22; an impeller or rotor I within the chamber C of the housing H; a drive shaft S fixed to the impeller and extending through the opening 22 of the housing H; and labyrinth means L which serves as both a fluid sealing means and an air metering means at and about the shaft S, as will hereinafter be described.

The housing H is an elongate cylindrical, substantially horizontally disposed assembly with a substantially flat radially disposed front wall 30, a cylindrical outside wall 31 and a radially extending rear wall 32. The front wall 30 defines a flat radially extending axially rearwardly disposed, front working surface 30' in the chamber C. The outside wall 31 defines a straight, cylindrical radially inwardly disposed, outside working surface 31' in the chamber C. In practice, the walls 30 and 31 are formed integrally. The front wall 30 is provided with or defines the inlet opening in its lowermost portion, which opening extends substantially axially through the wall. The side wall 31 is provided with or defines the outlet opening 21 which opening occurs at the lowermost or bottom side of the side wall and extends substantially vertically therethrough. In practice, and as shown, the openings 20 and 21 extend through elongate tubular nipples 20' and 21' projecting outwardly from their related walls of the housing and which provide mounting means for a related material delivery funnel F and a beverage conducting delivery hose or nozzle N, substantially as shown.

Finally, and in addition to the foregoing, the side wall of the housing is provided with a plurality of circumferentially spaced axially extending and radially outwardly projecting protruberances 34 with axially rearwardly opening threaded fastener receiving openings.

The front and side walls 30 and 31, with the openings 20 and 21, nipples 20' and 21' and protruberances 34 are preferably established and/or defined by a single molded plastic or die cast metal part.

The rear wall 32 is preferably a single unitary, molded or die cast part. The wall 32 extends radially and is characterized by an outer cylindrical body portion 35 which slidably enters the rear portion of the side wall 31, a radially outwardly projecting flange portion 36 which overlies and stops on the rear edge of the side wall 31, a central, axially extending tube portion 37 which projects forwardly from the mean plane of the back wall and into the confines of the chamber C and which defines the shaft opening 22. The rear wall further includes an annular intermediate portion 38 between the outer body portion 35 and the central tube portion 37. The intermediate portion 38 projects axially inwardly from the mean plane of the rear wall 32 and defines an axially extending radially outwardly disposed outer cylindrical surface 40 spaced radially inward of the outer cylindrical surface 31' of the chamber C, an annular, flat, radially extending forwardly disposed front surface 41 in axial spaced opposing relationship with the front surface 30' of the chamber and an axially forwardly and radially inwardly inclined inner surface 42 which joins the rear end of the tube portion 37. In accordance with good manufacturing practices and so as to conserve of material, the several surfaces 40, 41 and 42 of the portion 38 of the rear wall of the housing, as well as the other noted portions of the rear wall 32, are defined by related adjacent portions of said rear wall which are of substantially uniform thickness, as shown in the drawing.

The rear wall finally includes a plurality of circumferentially spaced, radially outwardly projecting tabs 45 with fastener receiving apertures to register with the protruberances 34 and the threaded openings therein, which occur or are provided on the side wall 31 of the housing.

In practice, and as shown in the drawings, a suitable sealing means 46 is provided between the body portion 35 and the rear of the rear wall 32 and the rear edge of the side wall 31. The means 46 can, as shown, comprise and O-ring groove about the inner rear edge of the side wall and an O-ring seal in said groove and engaged in the annular quarter defined by the portions 35 and 26 of the rear wall 32.

The two unitary portions of the housing are releasably secured together by screw fastening means engaged in and through the openings in the ears or tabs 45 and the protruberances 34, as shown in the drawings, and as will hereinafter be more fully described.

With the housing structure thus far described, it will be apparent that the chamber C defined by the housing and with which the several openings 20, 21 and 22 communicate, has a radially extending forward portion X of limited axial extent, an axially extending annular outer portion Y of limited radial extent, and continuing rearwardly from the forward portion X, and an axially extending annular inner portion Z of limited radial extent and extending or continuing rearwardly from the inner portion of the portion X. The outer portion Y of the chamber occurs radially outward of the intermediate portion 38 of the rear wall 32 and the inner portion Z occurs between the said intermediate portion 38 and the central tube portion 37 of the rear wall.

The rotor or impeller I is a unitary part characterized by a flat radially disposed front wall or disc portion 50 positioned within the forward portion X of the chamber C and defining flat axially disposed front and rear surfaces 51 and 52 in parallel and opposing relationship with the front surface 30' of the chamber C and the front surface 41 of the intermediate portion 38 of the rear wall of the housing and occurring within the chamber. The opposing surfaces 30' and 51 of the chamber and the rotor or impeller I are in free running spaced relationship with each other and are so spaced that upon relative rotation or movement of those surfaces, a surface effect is generated therebetween which effect is transmitted into and through any liquid, solid and/or gaseous mediums occurring between said surfaces and results in the intimate working together and commingling of the mediums.

The portions of the rear surface 52 of the front wall or disc portion of the rotor occurring radially inward and outward of the intermediate portion 38 of the rear wall extend radially through the forward portions of the inner and outer portions Z and Y of the chamber X.

The impeller I next includes an elongate annular outer sleeve-like ring portion 53 projecting rearwardly from the outer perimeter of the disc portion 50 and into the outer portion Y of the chamber. The sleeve or ring portion 53 has a straight cylindrical radially outwardly disposed outside surface 54 which occurs in opposing radial spaced, running clearance with the inside surface 31' of the chamber. The noted surfaces 31' and 54 are related so as to establish the same surface effect as do the surfaces 30' and 51 of the construction and serve to work upon ingredients, materials or mediums within the construction and between those surfaces, as do the surfaces 30' and 51, and as described above.

The outer ring or sleeve portion 53 of the impeller I has a straight cylindrical radially inwardly disposed inside surface 55 which is spaced a substantial distance from the outside surface 40 of the intermediate portion 38 of the rear wall and has an annular rear end or edge 56 which occurs in close running clearance with the portion of the rear wall 32 adjacent thereto.

It is to be noted that the outer ring or sleeve portion of the impeller occurs in and extends about the radial outer portion of the outer portion Y of the chamber C and that the inner portion of said chamber portion Y is substantially free and unobstructed.

The impeller structure I further includes a plurality of elongate circumferentially spaced radially extending, axially and forwardly opening and radially outwardly opening slots 60, extending radially outwardly from a central imperforate portion of the disc 51 which overlies and closes free axial access to the inner portion Z of the chamber, to the outer periphery of the disc portion and which extend or continue axially rearwardly in the outer ring or sleeve portion 53 of the impeller to open radially inwardly and outwardly relative thereto and which terminate in the ring portion forward of the rear edge thereof. In accordance with the above, the slots have radially extending inner portions and axially extending outer portions. The radial rear end portions of said radial portions of the slots occur adjacent and forward of the front surface 41 of the intermediate portion 38 of the rear wall of the housing.

It will be apparent that when the impeller is rotated, the outer end portion of said inner radially extending portions of the slots advance or move by the inlet opening 20 in the front wall of the housing, in close proximity thereto and that the outer axially extending portions of the slots move and/or advance by the outlet opening 21 in the bottom of the side wall of the housing, in close proximity thereto.

The slots in the impeller I serve several specific functions. First, the slots serve to receive, transfer and distribute materials introduced into the chamber through the inlet opening 20. More specifically, the slots receive, conduct and distribute said materials between the aforementioned opposing working surfaces of the rotor and the chamber; receive, conduct and deposit materials introduced into the chamber through the inlet opening 20, into the outer annular portion Y of the chamber, radially inward of the ring portion of the impeller; centrifugally cast, move and/or drive the materials therein radially outwardly in the chamber and to the outlet opening 21 for discharge therethrough; and, the inner end portions of the radially extending portions of the slots, cooperatively related with the front surface 41 of the intermediate portion 48 of the rear wall of the housing function to draw air from within the inner portion Z of the chamber and to pump and move that air radially outwardly through the slots to combine with materials in said slots to enter the portion Y of the chamber under pressure. When the chamber is sufficiently empty of material so that the outer axially extending portions of the slots are exposed to air in the portion Y of the chamber, the said axially extending portions of the slots function to further pump and advance the air pumped into the portion Y of the chamber radially outwardly into the annulus between the chamber and impeller and in such a manner as to be thoroughly and intimately mixed and combined with the materials in said annulus by the surface effect occurring therebetween and which was described in the foregoing. Still further, when the above noted annulus in the structure between the rotor and chamber is substantially empty of material, the slots continue to pump and move air, under pressure, radially outwardly into the noted annulus and thence circumferentially about the annulus to the outlet opening 21 for free discharge therethrough. This last noted pumping and/or movement of air in the chamber effectively drives and flushes out all free fluids in the construction, through the outlet opening, leaving the construction substantially clean and dry.

The impeller I is fixed to and is rotatably supported in the chamber C of the housing H by the shaft S. The shaft S is preferably formed integrally with the impeller, and as shown, is an elongate tubular part or portion projecting rearwardly from the center of the disc portion of the impeller and extends freely through the shaft opening 22 in or defined by the tubular portion 37 of the rear wall, with substantial running clearance. The rear end of the tubular shaft is open to cooperatively receive the output shaft S' of a related drive motor O.

The motor O and housing H are secured or mounted in fixed position relative to each other with the shaft S' in axial alignment with and engaged in the shaft S so as to freely support the impeller I within the chamber of the housing. The shafts S and S' are suitably locked or keyed together to establish and maintain rotary driving engagement therebetween. For example, the rear end of a shaft S can be slotted and the shaft S' can carry a drive pin which is engaged in the slot in the shaft S.

In the preferred carrying out of the invention and as shown in the drawings, the motor C and the sections of the housing are secured together in fixed assembled relationship with each other by a plurality (three) of circumferentially spaced axially extending tie bolts 65 engaged through the outer peripheral portion of the motor O, through suitable tubular mounting posts 66 between the motor and the rear wall 32 of the housing and thence through the apertured ears 45 on the rear wall and into the protruberances 34 on the side wall 31 substantially as shown.

The rotor or impeller I, in addition to those parts and/or portions noted in the preceding, is provided with a central elongate tubular projection 70 concentric and in radial outward spaced relationship from and about the shaft S and extending axially rearwardly into the portion Z of the chamber C in radial outward spaced relationship about the major forward longitudinal extent of the tube portion 37 of the rear wall. The shaft S, tube portion 37 and projection 70 cooperate to define a labyrinth passage with an outer end open to the exterior of the housing about the shaft S and with an inner open end at the interior of the housing at the inner portion C of the chamber, adjacent the rear end of the projection 70.

A labyrinth passage and/or structure defining that passage establishes the fluid sealing and metering means L that I provide.

In practice, the structure M is provided with a suitable mounting bracket 75 to facilitate mounting the structure in a related vending machine V. The bracket can vary widely in design and construction to meet any special requirements without in any way affecting the novelty of the present invention.

In operation, measured volumes of beverage concentrate, such as powdered cocoa, and of water are deposited in the funnel F by the dispensing means 15 and the water supply means 16 of the vending machine V. The ingredients, that is, the concentrate and water, are conducted by the funnel F and the inlet opening 20 in the housing. When the ingredients are introduced to the construction, as above noted, the motor O is energized and the impeller or rotor I is rotatably driven in the chamber. As the impeller rotates, the slots 60 are moved by the opening 20 and the ingredients at the opening flow into and through the slots and are carried and distributed in and throughout the chamber in the manner described in the foregoing. The ingredients are worked upon by and between the opposing working surfaces of the construction as noted above and are advanced radially outwardly and circumferentially in and through the chamber and thence to and out through the outlet opening 21 in the manner as set forth above.

Further, the air pumped into and through the construction by the impeller is mixed and intimately combined with the other ingredients, as they are mixed together and so that an aerated, foamy and/or full bodied mixture is substantially assured.

It is to be noted that the labyrinth passage of the means L is effective as a fluid seal and prevents the escape and/or passage of fluids in the chamber out of the construction, about the shaft S. It is further important to note that the labyrinth passage of the means L in addition to serving as a fluid seal also serves as an air metering means. Metering of the air being pumped into and through the construction is extremely important since the pumping and moving of excessive air into the chamber would likely result in air escaping or blowing out through the inlet opening, preventing the free introduction of materials into the chamber through said opening and materially adversely affecting the operation of the construction.

It is to be noted further that the movement of air in and through the labyrinth passage supplements the fluid sealing capability of that passage and effectively stops any fluid that might seek to enter the passage.

In addition to the foregoing, the mixer M that I provide can, as shown, be provided with or include recirculating or bypass means G to bypass a portion of the liquid mixture in the chamber C to the funnel F, for the purpose of washing and/or flushing any concentrate that might be caught or lodged in the funnel, from the funnel and into the chamber, through the inlet opening 20. As shown in the drawings, the means G includes a simple bypass duct or line 60 with an inlet end communicating with a bypass port 61 in the outer wall of the housing and having an outlet end extending to the upper end of the funnel F and disposed substantially tangentially to the inside surface of said funnel. With the means G thus provided, it will be apparent that a portion of the fluid mixture in the chamber is conducted from the chamber through the line 60 and is deposited in the upper end of the funnel in such a manner as to effectively and efficiently wash the interior of the funnel and conduct any materials caught or lodged therein, downwardly therein, through the inlet opening 20 in the housing and into the chamber C where the materials are again worked upon by the mixer and dispensed therefrom through the outlet opening 21. It is to be noted that the amount of fluid bypassed by the means G, in the manner set forth above, is easily and readily controlled by the diamter and/or flow capacity of line 60.

The structure provided to effect relating the funnel structure F with the inlet opening 20 in the housing H and the manner in which the material dispensing means 15, water supply means 16 and bypass means 16 are related to the funnel can vary widely in practice, without departing from the spirit of or in any way materially affecting the novelty of the present invention. Accordingly, I will not further and unduly burden this disclosure with further unnecessary detailed description of the funnel F.

Having described only one typical preferred form and application of my invention, I do not wish to be limited or restricted to the specific details herein set forth, but wish to reserve to myself any modifications and/or variations that may appear to those skilled in the art to which this invention pertains.

Having described my invention, I claim:

1. A beverage mixer comprising a housing with a chamber having a straight, cylindrical radially inwardly disposed outer surface and an axially rearwardly disposed, radially extending front surface, an inlet opening communicating with the chamber at said front surface, material supply communicating with the inlet opening, an outlet opening communicating with the chamber at said outer surface, a central shaft extending axially in the chamber and from the housing, an impeller on the shaft within the chamber and having a straight cylindrical radially outwardly disposed outside surface and a radially extending axially forwardly disposed forward surface, said outside and forward surfaces of the impeller occurring in opposing free running spaced relationship with the outer and front surfaces of the chamber whereby turbulent surface effect is imparted into fluid mediums therebetween upon relative rotation thereof, said impeller has circumferentially spaced radial and axially opening and extending slots movable by the inlet opening when the impeller is rotated to receive fluid material introduced into the chamber through that opening, to transport and distribute said material circumferentially, to centrifugally cast said material radially outwardly between said outer and front opposing surfaces and to centrifugally cast material advanced radially and circumferentially in the chamber to and out through said outlet opening.

2. The beverage mixer set fourth in claim 1 which further includes a radially extending axially forwardly disposed rear surface in the chamber, a radially extending axially rearwardly disposed rear surface on the impeller, said rear surfaces occurring in axial spaced, opposing running clearance; a central shaft opening communicating with the chamber at said rear surface thereof and through which said shaft freely projects, said slots in the impeller cooperating with the rear surface of the chamber to draw air into the chamber through the shaft opening and to centrifugally move said air radially outwardly in the chamber and between said opposing outer surface to commingle with fluid material therebetween when the impeller is rotated.

3. The beverage mixer set forth in claim 2, which further includes axially extending, radially spaced coaxial ports on the rotor and housing, about said shaft and shaft opening defining a fluid seal and air metering labyrinth communicating with the chamber and the exterior of the housing.

4. The beverage mixer set forth in claim 1, wherein said material supply means includes a material receiver to receive materials to be mixed and communicating with the inlet opening to conduct said materials through that opening and into the chamber.

5. The beverage mixer set forth in claim 4 which further includes bypass means to bypass a portion of the materials from within the chamber into the material receiver to flush materials in the receiver to the inlet opening, said bypass means including a radial opening bypass port in the housing opening at the outer surface of the chamber and a fluid conductor extending between said port and the material receiver.

6. The beverage mixer set forth in claim 5 which further includes a radially extending axially forwardly disposed rear surface in the chamber, a radially extending axially rearwardly disposed rear surface on the impeller, said rear surfaces occurring in axial spaced, opposing running clearance, a central shaft opening communicating with the chamber at said rear surface thereof and through which said shaft freely projects, said slots in the impeller cooperating with the rear surface of the chamber to draw air into the chamber through the shaft opening and to centrifugally move said air radially outwardly in the chamber and between said opposing outer surface to commingle with fluid material therebetween when the impeller is rotated.

7. The beverage mixer set forth in claim 6 which further includes axially extending, radially spaced coaxial ports on the rotor and housing, about said shaft and shaft opening defining a fluid seal and air metering labyrinth communicating with the chamber and the exterior of the housing.

8. The beverage mixer set forth in claim 1 which further includes bypass means to bypass a portion of the materials from within the chamber into the material supply means to flush materials in the material supply means to the inlet opening, said bypass means including a radial opening bypass port in the housing opening at the outer surface of the chamber and a fluid conductor extending between said port and the material supply means.

* * * * *